INVENTORS
JOHN T. MULLIN,
KENNETH CLUNIS
BY
Carpenter, Abbott, Coulter, and Kinney
ATTORNEYS INVENTORS
JOHN T. MULLIN,
KENNETH CLUNIS
BY
Carpenter, Abbott, Coulter, and Kinney
ATTORNEYS INVENTORS
JOHN T. MULLIN,
KENNETH CLUNIS
BY
Carpenter, Abbott, Coulter, and Kinney
ATTORNEYS United States Patent Office 3,346,703

Patented Oct. 10, 1967

3,346,703
TWO TRACK TRANSDUCING SYSTEM WITH MEANS TO EXTEND DYNAMIC RANGE

John T. Mullin, St. Paul, and Kenneth Clunis, Stillwater, Minn., assignors to Minnesota Mining and Manufacturing Company, St. Paul, Minn., a corporation of Delaware Filed Mar. 13, 1964, Ser. No. 351,768
10 Claims. (Cl. 179—100.2)

This invention relates to a transducing system and more specifically to recording and reproduction on a recording medium such as a magnetic tape of a signal representative of information such as music so as to increase the dynamic range of the transducing system.

The upper amplitude limit of recording and reproducing sound such as music is determined by the maximum amount of distortion which may be tolerated as the magnetic medium approaches saturation. The lower amplitude limit of recording and reproduction is determined by the minimum signal-to-noise ratio which may be tolerated before the noise component becomes objectionable to a listener. In a normal magnetic tape recording and reproduction system, a maximum dynamic range of approximately 55 decibels can sometimes be obtained. This invention is concerned with means for extending the dynamic range of a signal which may be recorded and reproduced to a range approaching 70 decibels.

In the co-pending application of John T. Mullin, Ser. No. 214,052, filed Aug. 1, 1962, now Patent No. 3,218,-396, there is described a system in which the dynamic range of a reproducing and recording system is extended by recording a signal at one level on one track of a tape and at a second higher level, for example, 15 decibels higher, on the other track of a magnetic tape. In reproduction, the signal recorded at the higher level is used whenever this signal is below the saturation of the tape. Whenever a saturation condition is approached, means are automatically provided for switching to the signal recorded at the lower level and the signal recorded at the lower level is utilized until the amplitude of the signal drops to a point at which the higher level track can again be used. In this way, the reproducing system automatically switches back and forth between the two tracks, utilizing the higher level recording where acceptable and the lower level recording at any time when the signal at the higher level might be subject to distortion.

While the system in the above described Mullin application represents a marked improvement over prior systems, it has been found that there is some tendency for a trained ear to hear a slight change of noise background when the switching is performed during the presence of lower signal frequencies. We have found that at lower frequencies, it is possible to have a relatively high decibel range which extends down into a level at which the tape noise is present. The human ear is less sensitive to background noise at these lower frequencies and is not conscious of this background tape noise.

The present invention is specifically concerned with an arrangement in which the recording is done at the same level for lower frequencies over a relatively wide dynamic range. Means are provided whereby as the frequency level increases beyond a certain point, the amplitude by which the signal is recorded on one track is gradually increased until a maximum recording level about 15 decibels higher is obtained for this one track. In playback, the signal from the track recorded at higher levels for higher frequencies is attenuated so that the output of the reproducing system connected to the playback head associated with this track is the same as that of the output from the head associated with the track at a lower level. Means are then provided, as in the earlier Mullin case, for automatically switching to the track recorded continuously at the lower level whenever a saturation condition is approached. In this way, it is possible to extend the dynamic range of the system without switching occurring at lower signal frequencies.

It is accordingly an object of the present invention to provide an improved arrangement employing two track recording in which switching occurs between the two tracks only in the higher frequency ranges at which the ear is not sensitive to the change in background noise.

Other objects of the invention will be apparent from the accompanying specification and drawing of which:

Figures 1, 2:
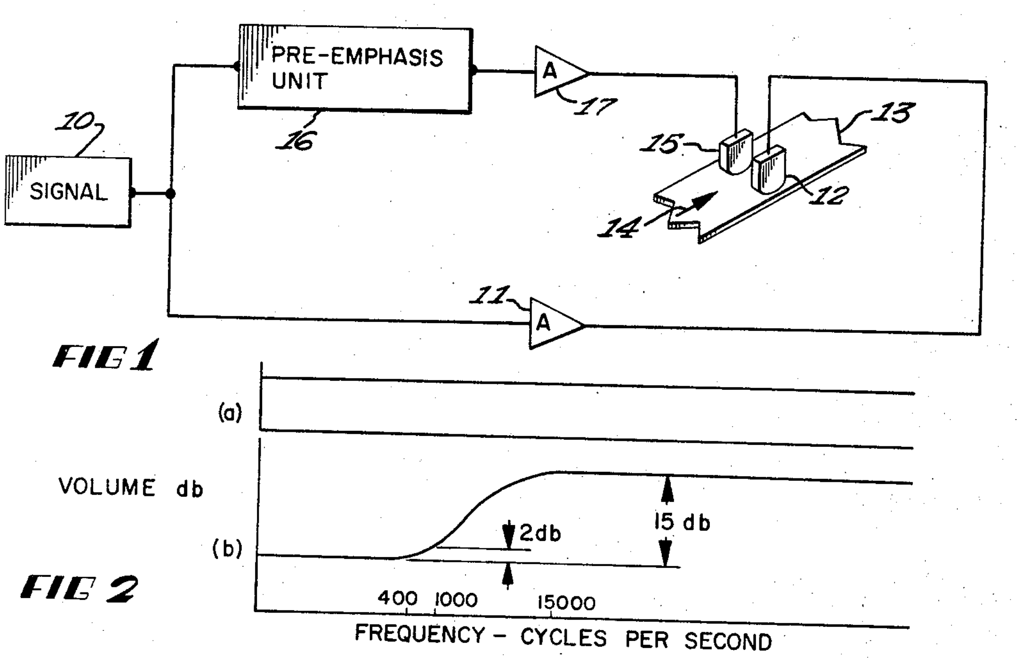
FIGURE 1 is a block diagram of a system for recording the same information at the same levels on two tracks on a recording medium when the frequency of the signal is relatively low and, when the frequency of the signal is in a higher range, at one level on one track and at a second variable level on the second track.
FIGURE 2 is a diagram showing the relative recording levels on the two tracks for various frequencies.

Referring now to FIGURE 1, an information signal is produced by a source 10 such as a microphone which converts audible sound into electrical signals. The information signal is applied through an amplifier 11 and through conventional bias means (not shown) to a recording head 12 associated with a recording medium such as a magnetic tape 13 which moves in the direction of the arrow 14 to produce a first track of information on the recording medium 13. The source 10 is also connected through a pre-emphasis unit 16, to be described later, to an amplifier 17. From the amplifier 17, the signal passes through a conventional bias unit (not shown) to a second head 15 associated with the recording medium 13. The bias units referred to above are conventional bias oscillators which operate at a frequency, for example, of 240 kilocycles per second. Such bias oscillators, which form no part of the present invention, are employed to apply a biasing signal to the heads so that the magnetic material of the recording medium 13 operates over a linear portion of its magnetic curve.

In FIGURE 2(*a*), I have shown the recording level for the head 12. It will be noted that this recording level is substantially constant in amplitude during the entire frequency range. In FIGURE 2(*b*), I have shown the level at which the signal is recorded on the track associated with head 15. The frequency scale is a nonlinear scale. It will be noted that up to a frequency of approximately 400 cycles, the recording is done at the same level as shown in FIGURE 2(*a*) in connection with the signal recorded by head 12. Due to the action of the pre-emphasis unit, the amplitude at which the signal is recorded through head 15 is gradually increased. By the time that a frequency of 1000 cycles per second is obtained, there has been an increase in recording level of approximately 2 decibels. The amplitude of recording level is gradually increased as the frequency increases until at a signal of approximately 15,000 cycles per second, the recording level is approximately 15 decibels higher than that at which the same signal is recorded by head 12 on the track associated with that head. It will be appreciated that the levels are depicted only in such a manner as to show their relative values with respect to each other and do not show their absolute values.

Figure 3:
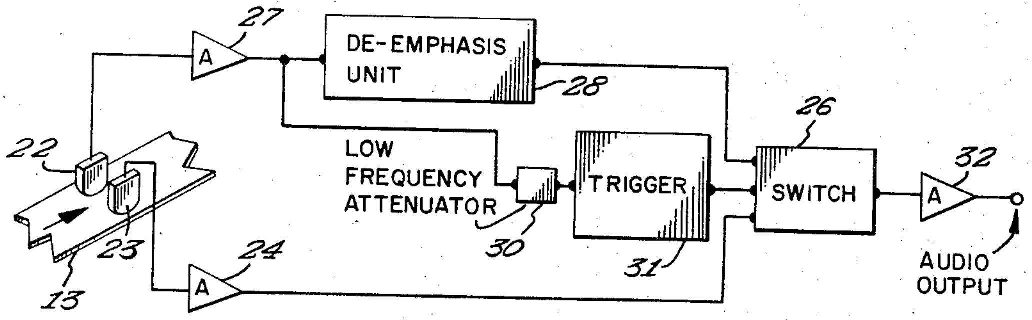
FIGURE 3 is a block diagram of a system for reproducing the information recorded on a recording medium by the system illustrated in FIGURE 1.

Turning now to FIGURE 3, the system for playing back the signal recorded on tape 13 is shown. Associated with this tape are two heads 22 and 23. The head 22 is associated with the same track as that with which the head 15 was associated; the head 23 is associated with the track with which head 12 was associated during the recording operation. The output of head 23 is applied to an amplifier 24 and passes from the output of this amplifier to a switch 26. The head 22 associated with the track which is recorded at a higher level for higher frequencies, is connected to an amplifier 27 and the signal from the head 22 is amplified by this amplifier 27. From amplifier 27, the amplified signal passes through a de-emphasis unit 28 which serves to attenuate the signal in exactly the same degree at which the signal was emphasized by the pre-emphasis unit 16. In other words, the curve of attenuation is exactly equal and opposite to the curve of FIGURE 2(*b*) showing the pre-emphasis introduced by pre-emphasis unit 16. Thus, the output signal of pre-emphasis unit 28 is exactly equal to the output signal from amplifier 24. This signal is likewise connected to the switch 26.

The output of amplifier 27 is also connected through a low frequency attenuator 30 to a trigger arrangement 31. The low frequency attenuator 30 serves to block any signal below 400 cycles so as to prevent it from reaching the trigger unit 31. The trigger 31, as will be described in more detail later, is effective to operate the switch 26. Whenever the signal from the higher level track associated with the head 22 is at such a high level of amplitude that distortion might occur due to saturation of the tape, the trigger 31 is effecive to operate the switch 26. Under normal conditions, the switch 26 is effective to pass the output from head 22, amplifier 27, and de-emphasis unit 28 to an output amplifier 32 connected to a suitable audio output such as a speaker. When, however, the trigger 31 is effective as the result of the signal measured by head 22 approaching saturation, the switch 26 is effective to connect the output of amplifier 24 to the output amplifier 32 in lieu of the output from amplifier 27.

Thus, as long as frequency is below a certain range or as long as the amplitude, regardless of the frequency, is below a level at which saturation of the tape might occur, the audio output amplifier 32 is supplied with the amplified output of head 22, which output is attenuated by the de-emphasis unit 28, associated with the track recorded at the higher level. When, however, the amplitude of the signal at higher frequencies is such that saturation might occur, the audio amplifier is connected to the output recorded at lower levels. Since switching occurs only because of high level, high frequency signals, the increase in background noise when reproducing from head 23 instead of head 22 is effectively masked by the signals themselves since this noise also lies essentially in the high frequency portion of the spectrum.

Figure 4:
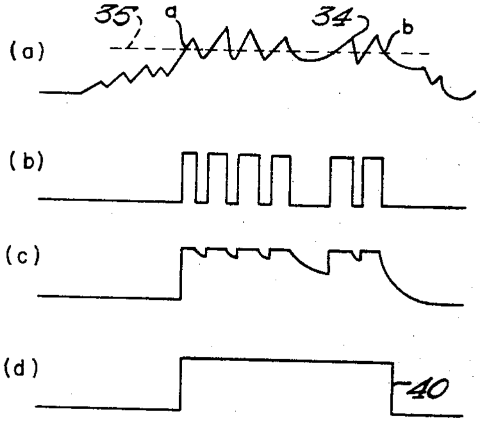
FIGURE 4 is a series of diagrams illustrating signals used in explaining the operation of the recording and reproducing systems on FIGURES 1 and 3.

FIGURE 4 depicts in diagrammatical form some of the operation of the trigger 31. A typical signal is illustrated by the line 34. The dotted line 35 depicts the maximum level at which it is possible for the signal to be recorded without distortion. It will be noted that this signal periodically passes above this level, beginning with point *a* and ending with point *b*. During this interval between points *a* and *b* on line 35, the signal periodically passes above line 35 for varying periods of time. The first stage of the trigger arrangement 31 is effective each time that the signal passes above the level depicted by line 35 to produce a square wave pulse, these pulses being shown in FIGURE 4(*b*). It will be noted that these pulses are of uniform amplitude and of varying length, depending upon the length of time in which the signal depicted by line 34 was above the amplitude represented by line 35. It is desirable to minimize, consistent with the response of the human ear, the number of times that switching takes place. Consequently, it is desired to switch instantly from head 22 to head 23 but not to switch back to head 22 except after some delay time following the lowering of the signal level below level 35. Consequently, means are provided in the trigger circuit for integrating the pulses shown in FIGURE 4(*b*). These pulses are first passed through a resistor capacitor network, to be described later, which delays the decay of the pulses so as to produce a resultant wave form similar to that shown in FIGURE 4(*c*). This wave form is then passed through a further trigger circuit to produce a square wave such as shown in FIGURE 4(*d*) which continues between points *a* and *b* during which time the signal frequency exceeds the level depicted by line 35. This square wave depicted by line 40 is then used to operate the switch 26. Thus, when the amplitude of the signal is such that it would repeatedly pass through a value depicted by the line 35, a square wave pulse 40 is produced cooperating with switch 26 and maintaining the switch 26 operative until such time as the amplitude of the signal drops to a value where it is generally below the line 35. During this period, as indicated above, the signal from head 23 is the one connected to the audio output. Because of the de-emphasis unit associated with amplifier 27, the signal from amplifier 27 at the time that such switching occurs is of the same amplitude as that from amplifier 24 associated with head 23.

Figure 5:
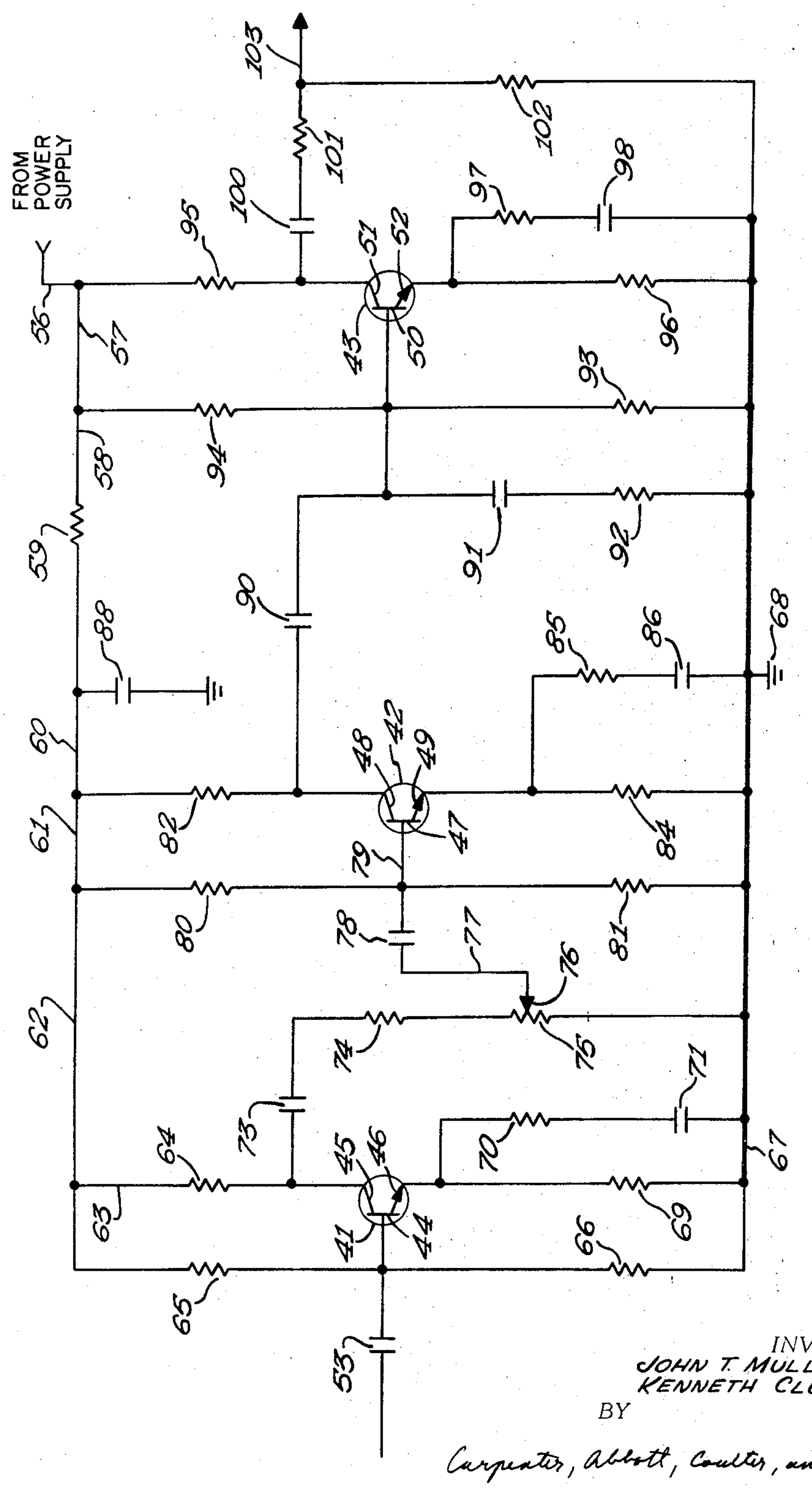
FIGURE 5 is a schematic of the pre-emphasis unit shown in block diagram in FIGURE 1.
Figure 6:
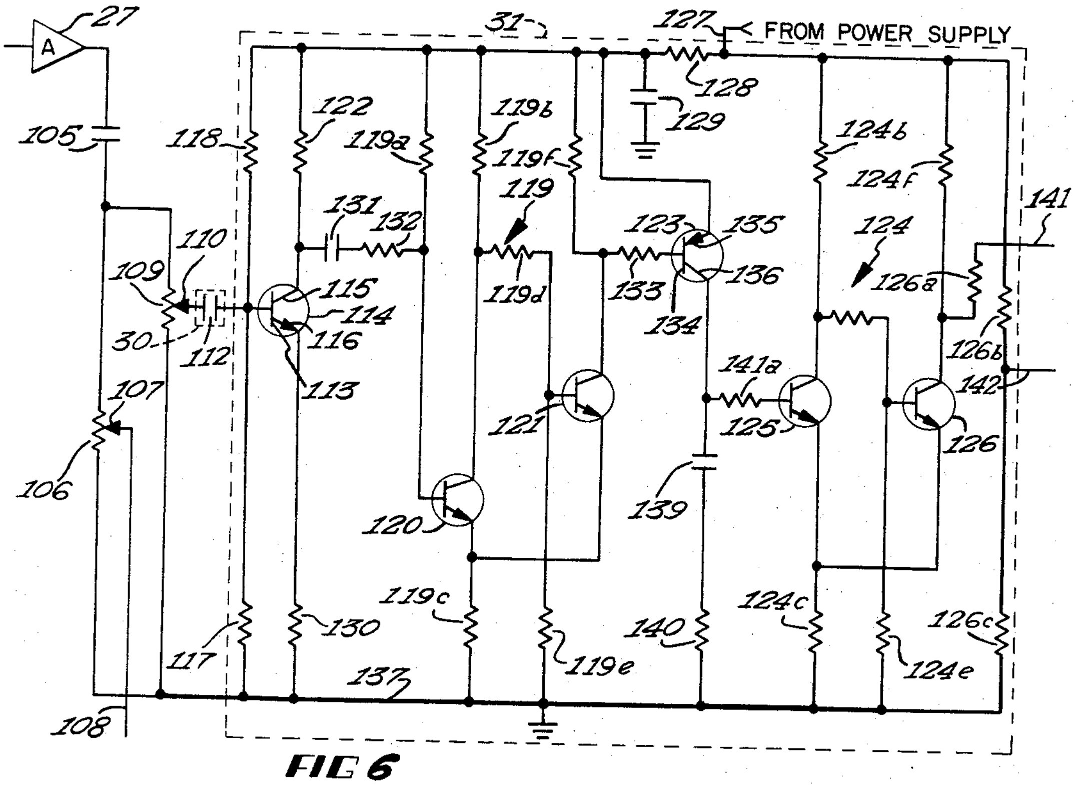
FIGURE 6 is a schematic view of the low frequency attenuator and trigger units shown in block diagram in FIGURE 3.
Figure 7:
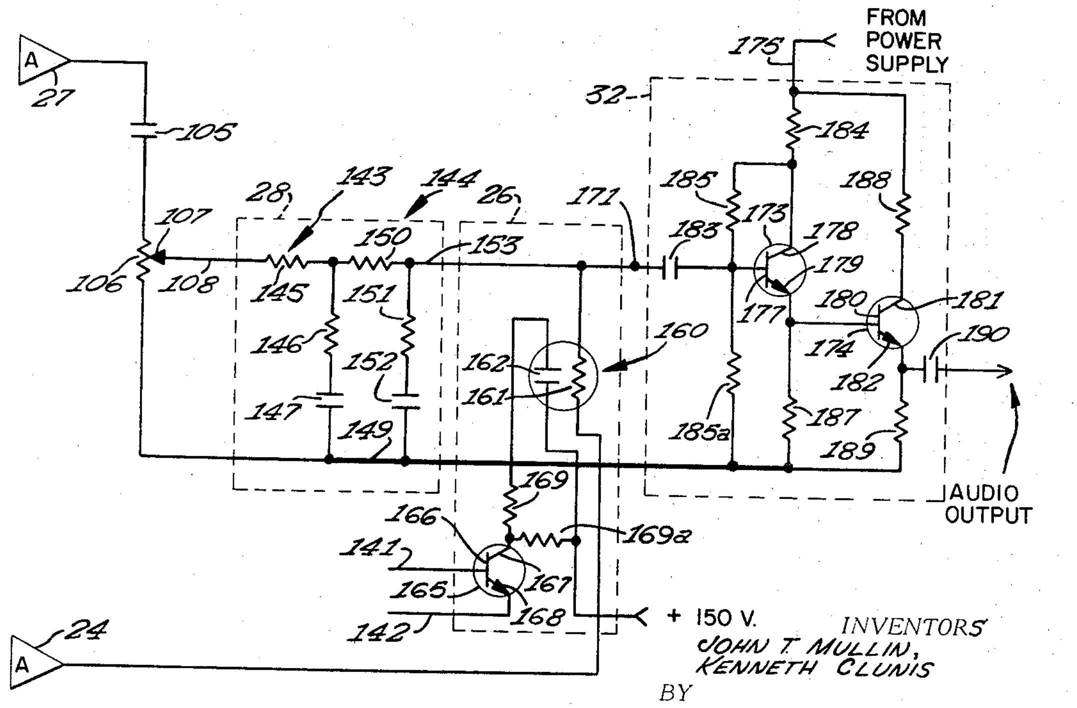
FIGURE 7 is a schematic showing the de-emphasis unit and the switch shown in block diagram in FIGURE 3.

Turning now to FIGURES 5, 6 and 7, the detailed circuit arrangements for some of the apparatus indicated in block form are shown. It is unnecessary to show the circuit components of amplifiers 11, 24 and 27 since these amplifiers may be of conventional construction. The pre-emphasis unit 16 and amplifier 17 are, however, shown in detail in FIGURE 5. These units comprise generally three stages of amplification provided by transistors 41, 42 and 43. Associated with these transistors 41 and 42 are various resistor capacitor networks to introduce the pre-emphasis explained in connection with unit 16. The three transistors 41, 42 and 43 are of conventional construction, being of the type commercially known as a 2N1974 transistor. Transistor 41 comprises a base 44, a collector 45 and an emitter 46. Transistor 42 comprises a base 47, a collector 48, and an emitter 49. Similarly transistor 43 comprises a base 50, a collector 51, and an emitter 52. The signal from the source 10 is connected through a blocking condenser 53 to the base 44 of transistor 41. Power is supplied from a suitable power supply over a conductor 56 to the collector 45 through conductors 57, 58, a resistor 59, conductors 60, 61, 62, 63 and resistor 64. A resistor 65 is connected between conductor 62 and base 44 and a similar conductor 66 is connected between the base and ground conductor 67 which is connected at a suitable point 68 to ground. Connected between the emitter 46 and ground conductor 57 is a resistor capacitor network consisting of a resistor 69 directly connected between emitter 46 and ground conductor 57 and a resistor 70 and condenser 71 connected in series with each other and parallel to resistor 69. The output of the transistor 41 is measured between the collector connection and ground and passes through a coupling condenser 73 and a fixed resistor 74 and a further resistor 75 with which is associated a movable slider 76. Thus, the output of transistor 41 appears across resistor 75 and a variable portion of this output is tapped off by slider 76 and is supplied through conductor 77, condenser 78, and conductor 79 to the base 47 of transistor 42. A resistor 80 is connected between conductor 61 extending to the power supply and the base 47. Similarly, resistor 81 is connected between the base 47 and the ground conductor 67. The emitter 48 is connected through a resistor 82 to the conductor 60 extending to the power supply. Connected between the emitter 49 and ground conductor 67 is another resistance capacitor network including a resistor 84 connected directly between the emitter 49 and ground and a resistor 85 connected in series with a condenser 86, the resistor 85 and condenser 86 being in parallel with resistor 84.

The power supplied from the power supply 56 to transistors 41 and 42 flows through a resistor 59 as previously noted. Connected between the left end terminal of resistor 59 and ground is a condenser 88. The combination of resistor 59 and condenser 88 acts as a filter to filter the power supplied to the earlier amplifier stages represented by transistors 41 and 42 to further reduce any possible ripples that might appear in the power supply.

The output of transistor 42 as measured by the emitter terminal 48 is applied through a coupling condenser 90 to base 50 of transistor 43. Associated with this connection of condenser 90 to base 50 is a condenser 91 and resistor 92 connected in series between the condenser 90 and ground. Connected between the base 50 and ground is a further resistor 93 and between the base 50 and conductor 57 leading from the power supply is a further resistor 94. The collector 51 is connected to the power supply through a resistor 95. The emitter 52 is connected to ground through a resistor capacitor network consisting of a resistor 96 and a resistor 97 and condenser 98 connected in parallel with resistor 96. Collector 51 is connected through a condenser 100 and a resistor 101 to an output conductor 103. The output of transistor 43 appears across a resistor 102 connected between conductor 103 and ground.

In the foregoing description, while the values of the components have not been identified for the most part, reference was made to the type of transistor employed. While it is to be understood that the values of the components are not critical and that the invention is not to be limited to any particular values, in a typical embodiment of the pre-emphasis unit and amplifier shown in FIGURE 5, components having the following values were employed:

Resistors:

| | | |
|---|---|---|
| 59 | kilohm | 1 |
| 64 | do | 1.5 |
| 65 | do | 86 |
| 66 | do | 10 |
| 69 | ohms | 270 |
| 70 | do | 150 |
| 74 | kilohm | 1 |
| 75 | do | 1 |
| 80 | do | 39 |
| 81 | do | 4.7 |
| 82 | ohms | 560 |
| 84 | do | 82 |
| 85 | do | 47 |
| 92 | do | 120 |
| 93 | kilohms | 3.3 |
| 94 | do | 27 |
| 95 | ohms | 470 |
| 96 | do | 47 |
| 97 | do | 22 |
| 101 | do | 180 |
| 102 | kilohms | 15 |

Capacitors:

| | | |
|---|---|---|
| 53 | microfarads | 10 |
| 71 | do | .22 |
| 73 | do | 10 |
| 78 | do | 25 |
| 86 | do | .15 |
| 88 | do | 50 |
| 90 | do | 25 |
| 91 | do | 12 |
| 98 | do | 1.5 |
| 100 | do | 25 |

Turning now to the operation of the amplifier of FIGURE 5, any increase in the instantaneous positive value of a signal applied to base 44 increases the flow of current between the collector and emitter and due to the relatively large resistor 64 reduces the voltage existing between collector 45 and ground. This voltage is that supplied to the base 47 and transistor 42. Thus, the transistor 42 acts as a phase inverter.

The current drop through resistor 69 tends to make the base less positive with respect to the emitter since the base is connected through resistor 66 to the ground terminal of resistor 69. Thus, the larger the voltage drop across resistor 69, the lower is the voltage that the base tends to be with respect to emitter 46. Considering further the effect of resistors 69 and 70 and condenser 71, the condenser 71 has a relatively high impedance to currents of low frequencies, this condenser having a value of 12 microfarads. Thus, at low frequencies, the resistance between emitter 46 and ground conductor 67 is effectively that of resistor 69. As the frequency increases, however, the impedance of condenser 71 drops and the impedance of the network between emitter 46 and ground decreases to decrease the voltage drop between emitter 46 and ground. This tends to raise the potential of base 44 with respect to emitter 46 making the transistor 41 more conductive. Thus, the gain of the transistor 41 tends to increase as the frequency goes up. After a relatively high frequency is obtained, the effect of the impedance of condenser 71 is relatively negligible with respect to that of resistors 69 and 70 and the gain of transistor 41 tends to flatten out as the frequency further increases. Thus, there is a tendency to get the increase in gain shown in FIGURE 2(*b*) in which the gain is relatively constant up to 400 cycles and thereafter increases until a maximum amplitude is obtained at about 15,000 cycles. This effect produced by resistors 69, 70 and 71 is further aided by resistors 96 and 97 and condenser 98 as will be described later. The signal as measured across the resistor 75 between the slider 76 and ground is applied to base 47 as previously explained. The transistor 42, as also previously mentioned, acts to invert the phase of the signal.

The network consisting of resistors 84, 85 and 86 are part of a standard NAB equalization network which likewise tends to increase the gain of amplifier 42 as the frequency rises. This is a standard expedient employed in all recording amplifiers and is for the purpose of compensating for certain non-linearities which would otherwise arise because of change in frequencies. This network, while somewhat similar to the network including resistors 69, 70 and 71, is provided for an entirely different purpose, however. This network is designed to tend to produce a linear output to correct for non-linear effects in other portions of the system such as recording head characteristics. This is in contrast to the changing output resulting from the networks consisting of resistors 69 and 70 and condenser 71 and, as will be described, resistors 96 and 97 and condenser 98.

The output of transistor 42, as measured between emitter 48 and ground 67, is applied through the condenser 90 to the base 50. The combined effect of condensers 90 and 91 and resistor 92 is likewise to provide NAB equalization to further maintain the output of the system constant despite changes in frequency and other non-linearities that would otherwise be present in the recording system. The signal from transistor 42 is supplied to the base 50 of transistor 43 where it is again inverted to be out of phase with the input to transistor 41. This transistor output is then supplied through blocking condenser 100 and resistor 101 to the output conductor 103, the output applied to conductor 103, as previously explained, being the voltage appearing across resistor 102.

Again, in connection with transistor 43, a network consisting of resistors 96 and 97 and condenser 98 tends to increase the gain of the amplifier as the frequency goes up. The function of this network is exactly the same as that consisting of resistors 69 and 70 and condenser 71 and the operation need not be repeated here. It is sufficient to state, however, that the combined effect of the two networks produces a relatively flat level up to 400 cycles and then a rising level up to 15,000 cycles as shown in FIGURE 2(*b*). These two networks constituted by the resistors 69 and 70 and condenser 71 on the one hand and the resistors 96 and 97 and condenser 98 on the other hand serve, in conjunction with the transistors 41, 42 and 43, to constitute the pre-emphasis unit and to introduce the pre-emphasis shown in FIGURE 2(*b*). The apparatus shown in FIGURE 5 not only serves to provide the pre-emphasis depicted in the block diagram of FIGURE 1 by the pre-emphasis unit 16 but also serves to provide the amplification illustrated in block diagram in FIGURE 1 by the amplifier 17. The conductor 103 is connected to the conventional bias oscillator normally used in recording and from there the signal passes to the recording head.

Turning now to FIGURE 6, we have shown in the circuit diagram, the low frequency attenuator 30 and the trigger circuit 31. From the output of amplifier 27, corresponding to amplifier 27 in the block diagram FIGURE 3, the circuit passes through a coupling condenser 105 and the signal is applied across a resistor 106 which has cooperating therewith a movable tap 107. The voltage across a portion of resistor 106, as determined by the position of tap 107, extends through conductor 108 to the de-emphasis unit 28 shown in block diagram in FIGURE 3 and shown in circuit form in FIGURE 7. The voltage across resistor 106 is also connected across a resistor 109 which cooperates with a further slider 110. A voltage across the lower portion of resistor 109, as determined by the position of slider 110, is connected through a condenser 112 to the base 113 of a transistor 114 which in addition to the base 113 includes a collector 115 and an emitter 116. The condenser 112 is a relatively small condenser, having a value of .033 microfarads, and serves as the low frequency attenuator as shown in FIGURE 3 as unit 30. Because of the relatively low capacitance of this unit, signals below a frequency of 400 cycles are substantially attenuated and are not applied to any substantial intent to the trigger circuit to be presently described. Signals of a frequency above 400 cycles are passed through condenser 112 to the base 113.

The trigger arrangement shown in FIGURE 6 basically consists of a first amplifying stage including transistor 114, having a base 113, a collector 115, and an emitter 116; a first Schmitt trigger 119 including transistors 120 and 121; a second amplifying stage including transistor 123; and a further Schmitt trigger 124 including transistors 125 and 126.

Power is supplied from a suitable regulated power supply through conductor 127. The power supply to the earlier stages including transistors 114 and 123 and the first Schmitt trigger stage 119 is further filtered through a resistor 128 and a condenser 129. The base 113 of transistor 114 is connected to ground through resistor 117 and to the power supply through resistor 118. The collector 115 is connected to the power supply through a resistor 122. The emitter 116 is connected through a resistor 130 to ground. The signal applied to base 113 of transistor 114 is amplified and connected through coupling condenser 131 and coupling resistor 132 to the base of transistor 120 of the Schmitt trigger. The circuit details and the operation of the Schmitt trigger 119 need not be described in detail since this is entirely conventional. Basically, the Schmitt trigger 119 comprises the transistors 120 and 121 which are connected to the power supply and are interconnected with each other by resistors 119 *a*, *b*, *c*, *d*, *e*, and *f*. Because of the feed back connections between transistors 120 and 121 by resistors 119*c* and *e*, when transistor 120 becomes conductive, the transistor 121 is abruptly cut off. Similarly, when the signal is such that transistor 120 becomes non-conductive, transistor 121 becomes abruptly conductive. Whenever the amplitude of the signal is above the level depicted by the line 35 in FIGURE 4(*a*), the Schmitt trigger is operated to produce a series of pulses such as shown in FIGURE 4(*b*). Since the feed back effect is such that transistor 121 is either fully conductive or fully non-conductive, depending upon whether a pulse occurs, it will be obvious that the height of these pulses is uniform regardless of the magnitude of the signal. These pulses are applied through a resistor 133 to the base 134 of transistor 123. Transistor 123 comprises an emitter 135 and a collector 136. Connected between the collector 136 and the ground conductor 137 is a condenser 139 and a resistor 140. The effect of this condenser is to cause a slow decay of the pulses. It will be readily apparent that when a pulse occurs causing conductivity of transistor 123, the abrupt change in current flow causes an abrupt increase in the voltage across resistor 140 since the condenser 139 initially has no charge and offers no impedance. This abrupt flow of current causes charging of condenser 139.

When the pulse disappears, the condenser 139 is still charged and tends to maintain a voltage between the upper terminal of condenser 139 and ground. It is this voltage between the emitter 136 and ground 137 which is applied to the second Schmitt trigger 124. This voltage is applied through a resistor 141*a* to the base of the transistor 125 of Schmitt trigger 124. Because of the effect of condenser 139 and resistor 140, the voltage applied to the Schmitt trigger 124 resembles that of FIGURE 4*c* for the signal condition depicted in FIGURE 4(*a*). Thus, for this condition, the voltage wave applied to the base of transistor 125 of Schmitt trigger 124 remains between points *a* and *b* of FIGURE 4(*a*) above a value necessary to cause the Schmitt trigger to operate in such a manner as to produce a pulse output. The result is that the output of the Schmitt trigger 124, instead of being a series of pulses as shown in FIGURE 4(*b*), is one continuous pulse. This voltage appears between the emitter of transistor 126 and ground and this voltage is applied through resistor 126*a* to conductor 141. A conductor 142 is connected to the junction of resistors 126*b* and 126*c* connected between the source of power and ground. Conductor 142 is thus maintained at a fixed potential with respect to ground. The voltage across conductor 141 and 142 is employed to control the trigger circuit shown in FIGURE 7.

Again, in connection with Schmitt trigger 124, we have not described the circuit components or the operation in detail since they are conventional. As in the case of Schmitt trigger 119, the Schmitt trigger 124 includes the transistors 125 and 126 which are connected to the power supply and interconnected to each other by resistors 124*b*, *c*, *d*, *e*, and *f*.

As with the circuit of FIGURE 6, the values and types of components are not critical as far as the invention is concerned. Purely by way of example, the following values were successfully employed in one embodiment:

| | | |
|---|---|---|
| Resistors: | | |
| 109 | kilohms | 5 |
| 117 | do | 33 |
| 118 | do | 220 |
| 119*a* | do | 68 |
| 119*b* | do | 3.3 |
| 119*c* | do | 5.6 |
| 119*d* | do | 1.8 |
| 119*e* | do | 6.8 |
| 119*f* | do | 2.2 |
| 122 | do | 2.7 |
| 124*b* | do | 3.3 |
| 124*c* | do | 5.6 |
| 124*d* | do | 1.8 |
| 124*e* | do | 6.8 |
| 124*f* | do | 2.2 |
| 126*a* | do | 1.8 |
| 126*b* | ohms | 470 |
| 126*c* | kilohms | 2 |
| 128 | ohms | 470 |
| 130 | do | 68 |
| 132 | kilohms | 10 |
| 133 | do | 1.8 |
| 140 | ohms | 47 |
| 141*a* | kilohms | 10 |
| Condensers: | | |
| 112 | microfarads | .033 |
| 129 | do | 50 |
| 131 | do | 10 |
| 139 | do | .05 |
| Transistors: | | |
| 114 | | 2N1974 |
| 120, 121, 125 & 126 | | 2N1985 |
| 123 | | 2N1991 |

Turning to FIGURE 7, we have shown in schematic form the circuit components of the de-emphasis unit 28, the switch 26, and the amplifier 32. As previously explained, the portion of the output from amplifier 27 applied across resistor 106 is tapped off by slider 107 connected to conductor 108. This was shown in FIGURE 6. In order to enable a ready comparison of FIGURES 3, 6 and 7, we have repeated in FIGURE 7 the amplifier 27, the coupling condenser 105, the potentiometer comprising resistor 106 and slider 107, and the conductor 108. The de-emphasis unit 28 comprises two resistor capacitive networks 143 and 144. Network 143 consists of resistors 145 and 146 and a condenser 147. Resistor 145 is connected in series with the signal path whereas resistor 146 and condenser 147 are connected in series with each other and in parallel with the signal voltage, being connected between the right hand terminal of resistor 145 and a ground conductor 149. The network 144 consists of a further resistor 150 in series with resistor 145 and a resistor 151 and condenser 152 in series with each other and connected between the right hand terminal of resistor 150 and ground conductor 149. An output conductor 153 leading into the switch unit 26 is connected to the right hand terminal of resistor 150.

Before describing the operation of the switch unit 26, the operation of the de-emphasis unit 28 will be briefly described. As the frequency of the output signal of amplifier 27, connected to head 22, increases, it will be apparent that the impedance of condensers 147 and 152 will decrease. Considering the first network 143 consisting of resistors 145, 146 and condenser 147, it will be obvious that the potential of the right hand terminal of resistor 145 will decrease as the impedance of condenser 147 decreases. The resistors 145 and 146 and condenser 147 act as a voltage divider so that as the impedance of the leg consisting of resistor 146 and condenser 147 go down, the voltage across this portion of the voltage divider decreases. A similar but cumulative action takes place in connection with the network 144 consisting of resistors 150 and 151 and condenser 152. Thus, the output of the de-emphasis unit 28 decreases as the frequency drops tends to drop off. The values of the various resistors and condensers and the manner in which they are interconnected are so chosen that the output remains relatively constant up to a frequency of 400 cycles, then drops off and finally reaches a minimum at about 15,000 cycles. The network is designed to produce a change exactly equal and opposite to that produced by the pre-emphasis unit 16. Below 400 cycles, the impedance of condensers 147 and 152 is relatively high so that there is a negligible amount of current flowing through these condensers. Under these conditions, substantially all of the input voltage appearing between conductor 108 and ground conductor 149 appears between the output conductor 153 and ground. Starting at 400 cycles, the impedance of condensers 147 and 152 increasingly become a factor. At about 15,000 cycles, the impedance of these condensers is so low that the voltage drop between conductor 153 and ground is determined largely by the relative impedances of resistors 145 and 146 and of 150 and 151. It will be appreciated that below 400 cycles the condensers 147 and 152 have some effect and that they also have a slight effect above 15,000. Generally, however, the main effect of these condensers occurs in the range of frequencies just discussed.

It will be apparent that the effect of de-emphasis unit 28 as pointed out in connection with FIGURE 3 is to attenuate the signal from amplifier 27 to eliminate the effect introduced by the pre-emphasis unit so that the output from the de-emphasis unit 28 is exactly equal to the output signal of amplifier 24.

The action of switch unit 26 will now be described. The switching is accomplished by means of a switching device 160 which embodies a light sensitive resistor 161 and a neon lamp 162 which is designed when adequately energized to illuminate the resistor 161 and to abruptly change its conductivity. A commercial device of this type may be purchased as a CK1011 "Raysistor." The resistor 161 has a resistance value of approximately 10 megohms when it is not illuminated by the neon light 162. When the light is turned on, the resistance of resistor 161 drops to about a 1,000 ohms. It will be obvious that this tremendous change in resistance can be utilized to cause the resistor 161 to operate effectively as a switch. The control of the energization of neon lamp 162 is accomplished by means of a transistor 165 having a base 166, collector 167 and emitter 168. The collector is connected through a resistor 169 to one terminal of the neon lamp 162, the other terminal of the lamp being connected to the positive terminal of a source of voltage of, for example, 150 volts. The collector 167 is also connected to the source through resistor 169*a*. The base 166 is connected to conductor 141 and the emitter 168 is connected to conductor 142, conductors 141 and 142 being previously referred to in connection with FIGURE 6 as leading from the trigger 31.

As previously explained in connection with FIGURE 6, the output of the trigger unit 31 is effective to impress a square wave voltage between conductors 141 and 142 for the period of time during which the output signal of amplifier 27 is above a value indicating possible saturation of the tape. When this square wave voltage is applied between the base and emitter 168, the transistor 165 is abruptly rendered conductive. At this time, a current can flow from the positive terminal of the source of voltage referred to previously, through the neon lamp 162, resistor 169, the collector 167, emitter 168, conductor 142, and resistor 126*c* (FIGURE 6) to ground. It will be apparent that upon a pulse signal occurring at the output of the trigger unit, the transistor 165 is rendered fully conductive and the neon light 162 is abruptly energized for so long as the output signal from amplifier 27 remains at an undesirably high level. When this occurs, resistor 161 is illuminated and its resistance drops from a value of 10 megohms to a value of approximately 1,000 ohms.

The function of resistor 161 is to determine whether the output of amplifier 27 or the output of amplifier 24 will be applied to the input of the amplifier 32. Referring to FIGURE 7, it will be noted that when the resistance of resistor 161 is relatively high, the output of amplifier 27 is applied without substantial attenuation (other than that due to the de-emphasis unit 28) through conductor 108, resistors 145 and 150 and conductor 153 to the input terminal 171 of amplifier 32. At the same time, because of the very high resistance of resistor 161, substantially no signal can flow from amplifier 24 to the input terminal 171 of amplifier 32, since resistor 161 is in series with the output of amplifier 24.

Let us now consider the condition in which the neon lamp 162 is turned on to illuminate the resistor 161. Under these conditions, the impedance of resistor 161 in series with amplifier 24 is drastically reduced to the point where it is substantially negligible. At the same time, there is a shunt path provided for the output from amplifier 27 through resistor 161 and the low impedance output circuit of amplifier 24. Because of the resistors 145 and 150 in series with the output of amplifier 27, the low resistance shunt path provided by resistor 161 and the low impedance output circuit of amplifier 24 results in very little of the output of amplifier 27 from being applied to the input terminal 171 since the impedance of the shunt path is now very low compared with that of resistors 145 and 150. The immediate result is that it is the output of amplifier 24 that is now effectively connected to input terminal 171 whereas the output of amplifier 27 is effectively disconnected from this input terminal. Thus, without the use of mechanical switches, the presence of a triggering voltage on the output conductors 141 and 142 of the trigger 31 causes the amplifier 27 to be effectively disconnected from the amplifier 32 and for the output of amplifier 24 to be effectively connected thereto.

The amplifier 32 is nothing more than a relatively conventional two stage transistor amplifier having two transistors 173 and 174. Power is supplied by conductor 175 from a suitable source of power supply. The transistor 173 comprises a base 177, a collector 178 and an emitter 179. Similarly, transistor 174 comprises a base 180, a collector 181 and an emitter 182. The output of amplifier 27 or 24 is applied to the base through a coupling condenser 183. A first resistor 184 is connected between the power supply conductor 175 and the collector 178 and a resistor 185 is connected between the collector 178 and base 177. A further resistor 185*a* is connected between the base and ground. An output resistor 187 is connected between the emitter 179 and ground. The voltage across resistor 187 is applied between the base 180 and emitter 182, there being a resistor 188 connected between the power supply conductor 175 and collector 111. Similarly, there is a resistor 189 connected between the emitter 182 and ground and the output voltage is measured across this resistor 189 being coupled to the audio output through a coupling condenser 190.

As with the circuits of FIGURES 6, 7 and 8, we have indicated below the values of components shown in FIGURE 7 and used in a typical embodiment of the apparatus. As indicated previously, this is only illustrative of the values which may be employed.

Resistors:

| | | |
|---|---|---|
| 145 | kilohms | 10 |
| 146 | do | 6.8 |
| 169 | do | 22 |
| 169*a* | do | 82 |
| 184 | do | 100 |
| 185 | megohms | 4.7 |
| 185*a* | do | 10 |
| 187 | kilohms | 470 |
| 188 | ohms | 100 |
| 189 | kilohms | 3.9 |

Capacitors:

| | | |
|---|---|---|
| 147 | microfarads | .0047 |
| 152 | do | .00047 |
| 171 | do | .15 |
| 190 | do | 10 |

Transistors:

| | |
|---|---|
| 165 | 2N1990 |
| 173 | 2N1974 |
| 173 | 2N1974 |

*Summary*

With the various components having been explained in detail and their operation individually explained, the overall operation of the system will be briefly reviewed.

As previously pointed out, the pre-emphasis unit 16 serves, beginning with a frequency of approximately 400 cycles, to gradually increase the amplitude of the signal supplied from the source so that the signal leaving the amplifier 17 and supplied to head 15 reaches an effective value at about 15,000 cycles per second which is 15 decibels higher than the effective value of the output of amplifier 11 which is applied to head 12. This action of the pre-emphasis unit is due to the resistance capacitive networks in this unit, the operation of which have been previously described in connection with FIGURE 5. Thus, there is recorded on the two tracks of tape 14 two signals which are of equal amplitude up to about 400 cycles and which progressively change in amplitude to a maximum differential of 15 decibels beginning with a frequency of 15,000. When this tape 14 is played back, the signal from the head 23 associated with the track recorded at a lower level is passed through an amplifier 24 and is normally disconnected from the audio output by the switch 26. The output of the head 22 associated with the other track passes through the amplifier 27 and de-emphasis unit 28 so as to remove the pre-emphasis placed into it by the resistance networks of unit 16. As a result, the output terminal of the de-emphasis unit is substantially the same as that of the output of amplifier 24 associated with head 23. The output of amplifier 27 associated with head 22 is likewise applied through a low frequency attenuator 30 to the trigger arrangement 31 described in connection with FIGURE 6. This trigger circuit produces a pulse 40 such as shown in FIGURE 4*d* whenever the output of amplifier 27 is at a value which would tend to be associated with distortion accompanying saturation of the magnetic tape. This pulse is applied to switch 26 to illuminate the neon bulb 162 of FIGURE 7 to drastically reduce the resistance of resistor 161, thereby effectively disconnecting the output of amplifier 27 from the input of amplifier 32 and connecting the output of amplifier 24 to amplifier 32. Thereafter, until the intensity of the signal drops again the signal applied to the audio output is the signal developed by head 23 associated with the track recorded at a lower level. In actual practice, the duration of high intensity signals is very short so that the switching accomplished by switch 26 is usually of very short duration.

With the present invention, markedly better results have been obtained with the system shown in my copending application referred to above, in that the switching is confined only to the high frequency portion of the signal range so that the change in intensity of background noise is practically imperceptible to the human ear. At the same time, no switching is accomplished at the lower frequency levels where a change in background noise may be perceptible to a trained ear. Where there is a marked amplitude range at these lower frequencies, it is possible that the sound may extend into a lower amplitude range where background noise is slightly present. This can be tolerated, however, at the lower frequency ranges because the ear is less sensitive to background noise at these lower frequencies and is more accustomed to the presence of background noise at such frequencies.

It will, therefore, be seen that we have provided a recording and reproducing system in which it is possible to have an extremely wide dynamic range without any distortion to which even a trained ear is conscious appearing in the audio output.

While we have described a specific embodiment for purposes of illustration, it is to be understood that our invention is limited only by the scope of the appended claims.

What is claimed is:

1. In combination in a recording system including means for increasing the dynamic range of the system to record on a recording medium an information signal having a wide amplitude range, first means responsive to the information signal for producing a first level output signal having characteristics in accordance with the characteristics of the information signal, second means disposed relative to the recording medium and operatively coupled to the first means and responsive to the first level output signal for recording the first level output signal on the recording medium, third means responsive to the information signal for producing a second level output signal having characteristics corresponding to the characteristics of the information signal, fourth means associated with said third means for changing the relative values of said first and second levels beginning with signals of a predetermined frequency and increasing the differential between said levels as the signal frequency increases until a predetermined differential is maintained for signals of above a predetermined higher frequency, and fifth means disposed relative to the recording medium and operatively coupled to the third means and responsive to the second level output for recording the second level output signal on the recording medium.

2. In combination in a recording system including means for increasing the dynamic range of the system to record without distortion on a recording medium an information signal having a wide amplitude range, first means responsive to the information signal for producing a first level output signal having characteristics in accordance with the characteristics of the information signal, second means disposed relative to the recording medium and operatively coupled to the first means and responsive to the first level output signal for recording the first level output signal on the recording medium, third means responsive to the information signal for producing a second level output signal and having characteristics corresponding to the characteristics of the information signal, fourth means associated with said third means for increasing the value of said second level above said first level beginning with signals of a predetermined frequency and continuing as the signal frequency increases to increase the value of said second level until said second level is higher than said first level by a predetermined differential and thereafter substantially maintaining said predetermined differential with higher frequencies, and fifth means disposed relative to the recording medium and operatively coupled to the third means and responsive to the second level output for recording the second level output signal on the recording medium.

3. In combination in a recording system including means for increasing the dynamic range of the system to record on a recording medium an information signal having a wide amplitude range, first means responsive to the information signal for producing a first level output signal having characteristics in accordance with the characteristics of the information signal, second means disposed relative to the recording medium and operatively coupled to the first means and responsive to the first level output signal for recording the first level output signal on the recording medium, third means responsive to the information signal for producing a second level output signal having characteristics corresponding to the characteristics of the information signal, fourth means associated with said third means for changing the relative values of said first and second levels beginning with signals of a predetermined frequency and increasing the differential between said levels as the signal frequency increases until a predetermined differential is maintained for signals of above a predetermined higher frequency, said fourth means including a resistor capacitor network the effective impedance of which is relatively constant below said first named predetermined frequency and above said predetermined frequency but changes between said frequencies from a first to a second value, and fifth means disposed relative to the recording medium and operatively coupled to the third means and responsive to the second level output for recording the second level output signal on the recording medium.

4. In combination in a recording and reproducing system including means for increasing the dynamic range of the system to record on a recording medium an information signal having a wide amplitude range and to reproduce the information signal from the medium without distortion, first means disposed relative to the recording medium and responsive to the information signal for recording the information signal on the recording medium at a first level, second means disposed relative to the recording medium and responsive to the information signal for recording the information signal on the recording medium at a second level which is the same as said first level for signal frequencies below a first predetermined value and becomes increasingly higher than said first level as the signal frequency increases until a relatively constant differential between said first and second levels is maintained for frequencies above a second predetermined value, and third means disposed relative to the recording medium for reproducing the information signal recorded by the second means for amplitude values of the information signal below a particular value and for reproducing the output signal recorded by the first means only for amplitude values of the information signal above the particular value and above said first predetermined frequency.

5. In combination in a recording and reproducing system including means for increasing the dynamic range of the system to record on a recording medium an information signal having a wide amplitude range and to reproduce the information signal from the medium without distortion, first means disposed relative to the recording medium and responsive to the information signal for recording the information signal on the recording medium at a first level, second means disposed relative to the recording medium and responsive to the information signal for recording the information signal on the recording medium at a second level which is the same as said first level for signal frequencies below a first predetermined value and becomes increasingly higher than said first level as the signal frequency increases until a relatively constant differential between said first and second levels is maintained for frequencies above a second predetermined value, third means disposed relative to the recording medium for reproducing the signal recorded by the first means and for amplifying the same, fourth means disposed relative to the recording medium for reproducing the signal recorded by the second means and for amplifying the same with an amplification gain which with signals above said first predetermined value of frequency decreases in such a manner that the resultant amplified signal is equal in amplitude throughout the frequency range to that produced by said third means, an output circuit, and fifth means for normally connecting the output of said fourth means to said output circuit but effective only for amplitude values of the information signal above a particular value to connect the output of said third means instead of that of said fourth means to said output circuit.

6. The recording and reproducing system of claim 5 in which attenuating means is associated with said fifth means to prevent said fifth means from transferring said output circuit from connection with said fourth means to connection with said third means regardless of the amplitude of said signal when the frequency thereof is below said first predetermined frequency.

7. In combination in a recording and reproducing system including means for increasing the dynamic range of the system to record on a recording medium an information signal having a wide amplitude range to reproduce the information signal from the medium without distortion, first means disposed relative to the recording medium and responsive to the information signal for recording the information signal on the recording medium at a first level, second means disposed relative to the recording medium and responsive to the information signal for recording the information signal on the recording medium at a second variable level depending upon the signal frequency, third means disposed relative to the recording medium for reproducing the signal recorded by the first means and for amplifying the same, fourth means disposed relative to the recording medium for reproducing the signal recorded by the second means and for amplifying the same, fifth means for equalizing the amplified outputs of said third and fourth means, and sixth means connected to said third and fourth means for supplying to an output transducer the output of said fourth means when the amplitude values of the information signal are below a particular value and for supplying to the transducer the equalized output of said third means when the values of the information signal are above a particular value at which distortion might occur.

8. The system of claim 7 in which the sixth means includes a resistor for controlling whether the transducer is supplied with the output of said third or said fourth means and in which electronic means responsive to the amplitude of the output of the fourth means is effective to change abruptly and very materially the resistance of said resistor whenever the amplitude of the output of the fourth means exceeds a value at which distortion might occur.

9. The system of claim 7 in which the sixth means includes a resistor connected in series with the output of said third means and in parallel with the output of said fourth means and in which electronic means responsive to the amplitude of the output of the fourth means is effective to decrease abruptly and very materially the resistance of said resistor whenever the amplitude of the output of the fourth means exceeds a value at which distortion might occur.

10. In combination in a recording and reproducing system including means for increasing the dynamic range of the system to record on a recording medium an information signal having a wide amplitude range and to reproduce the information signal from the medium without distortion, first means disposed relative to the recording medium and responsive to the information signal for recording the information signal on the recording medium at a first level, second means disposed relative to the recording medium and responsive to the information signal for recording the information signal on the recording medium at a second level which is constant for signals of a frequency below a predetermined value and variable in accordance with frequency for signals in a higher frequency range, third means disposed relative to the recording medium for reproducing the signal recorded by the first means and for amplifying the same, fourth means disposed relative to the recording medium for reproducing the signal recorded by the second means and for amplifying the same, fifth means for equalizing the amplified outputs of said third and fourth means, and sixth means connected to said third and fourth means for supplying to an output transducer the output of said fourth means when the amplitude values of the information signal are below a particular value and for supplying to the transducer the equalized output of said third means when the frequency of the information signal is above said predetermined value and the amplitude is above a value at which distortion might occur.

References Cited

UNITED STATES PATENTS

| | | | |
|---|---|---|---|
| 1,925,608 | 9/1933 | Round | 179—100.3 |
| 3,207,854 | 9/1965 | Johnson | 179—100.2 |

BERNARD KONICK, *Primary Examiner.*

J. R. GOUDEAU, *Assistant Examiner.*